R. G. KANN.
GLASS.
APPLICATION FILED JUNE 2, 1913.
1,085,432.
Patented Jan. 27, 1914.
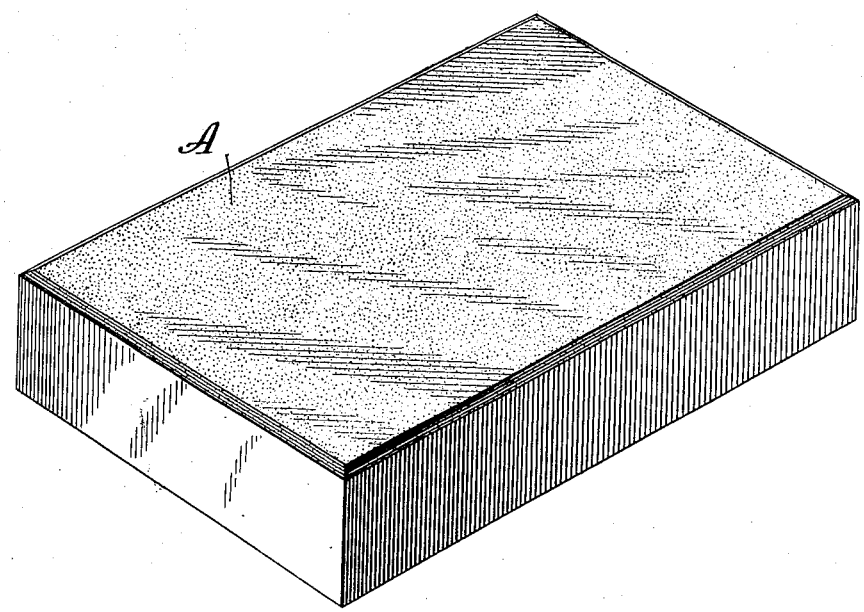
WITNESSES
R. A. Balderson
Jesse B. Heller
INVENTOR
R. G. Kann,
by Bakewell, Byrnes & Parmelee,
Attys.

UNITED STATES PATENT OFFICE.

RALPH G. KANN, OF PITTSBURGH, PENNSYLVANIA.

GLASS.

1,085,432.   Specification of Letters Patent.   Patented Jan. 27, 1914.

Application filed June 2, 1913. Serial No. 771,163.

*To all whom it may concern:*

Be it known that I, RALPH G. KANN, a citizen of the United States, residing at Pittsburgh, in the county of Allegheny and State of Pennsylvania, have invented a new and useful Improvement in Glass, of which the following is a full, clear, and exact description, reference being had to the accompanying drawing, forming part of this specification, in which the figure is a perspective view of a glass block or slab embodying my invention.

My invention has relation to improvements in glass, such as is used for tiles, slabs, blocks, and other shapes employed in the construction and interior finish of buildings and other structures. Opaque glass articles of this character are now being largely used in interior finishing work, in place of marble and other materials. While this material has many advantages over marble, it is not an effective substitute for marble in finished appearance, owing to its characteristic "glassy" luster, which gives it a cheap appearance.

My invention is designed to overcome this objection by providing structural material in the form of opaque glass whose exposed surface or surfaces present a soft finish, as distinguished from a hard or high glassy polish.

Articles made in accordance with my invention present a surface appearance which very closely resembles marble which has not been polished to a high degree, and which lacks the vitreous gloss which has heretofore been a characteristic of such articles. Glass embodying my invention retains all the sanitary features of the old product, and presents a very much better and richer appearance. In the manufacture of these articles, after they have been shaped by rolling or otherwise, in the usual manner, the surfaces to be finished are first ground and then smoothed with emery or other fine abrasive. Instead, however, of carrying this grinding and smoothing to a point which has heretofore been considered necessary before polishing, I stop the smoothing operations while still using a relatively coarse abrasive. The surface at this time is generally smooth, but when examined closely is seen to be made up of a multitude of very small pits. I then subject this surface to the usual polishing operations, which may be carried to any desired extent. I have discovered that when this finely pitted surface is polished, it takes a finish which is radically different in appearance from ordinary polished opaque glass. The fine pits are still present and the usual "glassy" luster is lacking, even when the surface is brought to a high polish.

In the case of white glass, for instance, the finished surface of the article has the dead white appearance of white marble which has been cut and smoothed, but not highly polished. It has, however, the advantage over marble that it can be used in this condition without deteriorating; whereas, as is well known, marble, if not highly polished, will soon show surface deterioration.

The accompanying drawing shows at A a block or slab of glass to which my invention is applicable, although it is of course impossible in a drawing of this character to indicate the true surface appearance of the article.

A room or other apartment finished with this glass has an extremely rich appearance, which is highly agreeable to the eye. In the ordinary glass as made and used heretofore, the surface is so "glassy" that it acts as a more or less perfect mirror. In my improved glass the surface is "dead" to such an extent that it has substantially no mirror action or appearance.

My invention is applicable to opaque glass articles of various shapes, and colors, in all of which its characteristic surface finish and appearance can be readily detected.

I claim:—

1. As a new article of manufacture, opaque glass having a ground and polished surface characterized by a dead or dull appearance as distinguished from a vitreous glaze or luster.

2. As a new article of manufacture, opaque glass having a partially ground and polished surface characterized by the presence therein of minute pits which are plainly visible to the naked eye and by the absence of a glassy luster; substantially as described.

3. As a new article of manufacture, opaque glass having a partially ground and polished surface and characterized by the absence of a glassy luster; substantially as described.

In testimony whereof, I have hereunto set my hand.

RALPH G. KANN.

Witnesses:
 GEO. B. BLEMING,
 GEO. H. PARMELEE.